(12) United States Patent
Bae et al.

(10) Patent No.: US 7,595,477 B2
(45) Date of Patent: Sep. 29, 2009

(54) ANTI- REFLECTIVE DEVICE HAVING AN ANTI-REFLECTION SURFACE FORMED OF SILICON SPIKES WITH NANO-TIPS

(75) Inventors: Youngsman Bae, Gardena, CA (US); Sohrab Mooasser, Santa Monica, CA (US); Harish Manohara, Arcadia, CA (US); Choonsup Lee, Pasadena, CA (US); Kungsam Bae, Gardena, CA (US)

(73) Assignee: California Institute of Technology, Pasadena, CA (US)

( * ) Notice: Subject to any disclaimer, the term of this patent is extended or adjusted under 35 U.S.C. 154(b) by 207 days.

(21) Appl. No.: 11/518,537

(22) Filed: Sep. 7, 2006

(65) Prior Publication Data
US 2009/0108183 A1 Apr. 30, 2009

Related U.S. Application Data

(60) Provisional application No. 60/715,375, filed on Sep. 7, 2005.

(51) Int. Cl.
*H01J 3/14* (2006.01)
(52) U.S. Cl. .............. 250/216; 250/208.1; 250/206.1; 359/229
(58) Field of Classification Search ............ 205/216, 205/208.1, 237 R, 203.4, 206.1, 206.2; 359/601, 359/229, 614
See application file for complete search history.

(56) References Cited

U.S. PATENT DOCUMENTS 5,817,396 A * 10/1998 Perlo et al. ............ 428/141
6,175,442 B1 * 1/2001 Booth et al. ........... 359/290
6,514,674 B1 * 2/2003 Iwasaki ................. 430/321
6,884,988 B2 * 4/2005 Burnett ................. 250/216
7,170,666 B2 * 1/2007 Piehl et al. ............. 359/290
7,381,461 B2 * 6/2008 Chiang et al. .......... 428/310.5
2002/0089750 A1 * 7/2002 Hoshi ................... 359/566
2003/0102286 A1 * 6/2003 Takahara et al. ......... 216/45

OTHER PUBLICATIONS

C. C. Liebe; S. Mobasser, "MEMS Based Sun Sensor", Aerospace Conference, 2001, IEEE Proceedings. vol. 3, 2001, pp. 1565-1572.*
S. Mobasser; C. C. Liebe, "MEMS based Sun Sensor on a Chip", 2003 IEEE Conference on Control Applications, Jun. 23-25, 2003.*

(Continued)

*Primary Examiner*—Stephen Yam
(74) *Attorney, Agent, or Firm*—Tope-McKay & Associates

(57) ABSTRACT

Described is a device having an anti-reflection surface. The device comprises a silicon substrate with a plurality of silicon spikes formed on the substrate. A first metallic layer is formed on the silicon spikes to form the anti-reflection surface. The device further includes an aperture that extends through the substrate. A second metallic layer is formed on the substrate. The second metallic layer includes a hole that is aligned with the aperture. A spacer is attached with the silicon substrate to provide a gap between an attached sensor apparatus. Therefore, operating as a Micro-sun sensor, light entering the hole passes through the aperture to be sensed by the sensor apparatus. Additionally, light reflected by the sensor apparatus toward the first side of the silicon substrate is absorbed by the first metallic layer and silicon spikes and is thereby prevented from being reflected back toward the sensor apparatus.

6 Claims, 7 Drawing Sheets

OTHER PUBLICATIONS

R. Bilyalov; L. Stalmans; J. Poortmans, "Comparative Analysis of Chemically and Electrochemically Formed . . .", Journal of Electrochemical Society, 150 (3), pp. G216, 2003.*

K. Habodas; S. Kirsch; A. Carl; M. Acet; E. F. Wassermann, "Reflection properties of nanostructure-arrayed silicon surfaces", Nanotechnology 11 pp. 161 2000.*

G. Kumaravelu; M. M. Alkaisi; A. Bittar, "Surface Texturing for Silicon . . . " IEEE Photovoltaic Specialists Conference 2002 Conference Record of the Twenty-Ninth IEEE, pp. 258.*

H. Manohara, "Field Emission Testing of Carbon Nanotubes for THz Frequency Vacuum Micro-Tube Sources", NASA Tech Briefs, vol. 28, No. 11, pp. 62, Nov. 2004.*

* cited by examiner

US 7,595,477 B2

ANTI-REFLECTIVE DEVICE HAVING AN ANTI-REFLECTION SURFACE FORMED OF SILICON SPIKES WITH NANO-TIPS

PRIORITY CLAIM

The present invention is a non-provisional patent application, claiming the benefit of priority of U.S. Provisional Application No. 60/715,375, filed on Sep. 7, 2005, entitled, "Novel Nano-Tips Antireflection Surface."

GOVERNMENT RIGHTS

The invention described herein was made in the performance of work under a NASA contract, and is subject to the provisions of Public Law 96-517 (35 USC 202) in which the Contractor has elected to retain title.

FIELD OF INVENTION

The present invention relates to an anti-reflective surface and, more particularly, to a device having a plurality of nano-tips to form the anti-reflective surface.

BACKGROUND OF INVENTION

The National Aeronautics and Space Administration (NASA) is in the business of completing interplanetary missions. NASA headquarters are located at 300 East Street, Southwest, Washington, D.C. NASA's planetary surface exploration missions that have landed on the surface of Mars included one or more sun sensors. The sun sensors have been used to determine the direction of a rover or to establish three-axis attitude information to point a high-gain antenna toward the earth. A Micro-sun sensor (MSS) is being developed and flight qualified for future Mars missions. The MSS is a miniaturized pinhole camera consisting of a mask, a spacer, and a focal plane. The focal plane is an active pixel sensor (APS) chip and the optics is a piece of silicon wafer coated on one side with a 300 nanometer (nm) thick gold layer perforated by an array of pinholes of ~50 micrometer (μm) diameter. This serves the purpose of a mask, and is mounted on a spacer ~1000 μm from the APS, making the system a pinhole camera. The sun's rays penetrate the silicon mask through the pinholes and form an image on the APS. On the basis of the location of the image on the APS, the MSS determines sun angles that can be used to compute location coordinates with respect to the sun. However, this setup suffers from multiple internal reflections from the focal plane onto the back of the reflective gold-coated mask, and back onto the focal plane, thereby causing ghost images. The ghost images severely limit the accuracy of the MSS. This problem can be corrected by employing an antireflective surface on the back of the mask.

Many different types of anti-reflection surfaces have been described in the prior art. For example, a porous silicon surface has been used as an antireflection surface. While antireflective, such a structure is easily damaged. As another example, a sub-wavelength structure with a surface grating period smaller than the light wavelength has been used for an antireflection surface; however, creation of the structure requires an expensive fabrication process.

While prior art exits, nothing heretofore devised can be economically created and be strong enough so that it is not easily damaged. Thus, a continuing need exists for an anti-reflection surface that can be economically created and used in a myriad of applications.

SUMMARY OF INVENTION

The present invention relates to an anti-reflective device. The device comprises a silicon substrate having a first side and a second side. The first side includes a plurality of silicon spikes with nano-tips. A first metallic layer is formed on the silicon spikes, thereby forming an anti-reflection surface.

In another aspect, the silicon spikes are formed to have a high-aspect ratio.

In yet another aspect, the silicon spikes are formed on the first side such that an aperture exists on the first side. The aperture extends from the first side to the second side and is surrounded by silicon spikes on the first side. Thus, light is capable of entering and exiting the substrate through the aperture.

In yet another aspect, the first metallic layer comprises a layer of chromium and a layer of gold.

In another aspect, the present invention further includes a second metallic layer formed on the second side of the silicon substrate. The second metallic layer includes a hole formed there through. The hole is formed to be aligned with the aperture. Additionally, a spacer is attached with the first side of the silicon substrate and a sensor apparatus is attached with the spacer such that a gap exists between the sensor apparatus and the silicon substrate. Therefore, light entering the hole passes through the aperture to be sensed by the sensor apparatus, and light reflected by the sensor apparatus toward the first side of the silicon substrate is absorbed by the silicon spikes and is thereby prevented from being reflected toward the sensor apparatus.

In yet another aspect, an array of apertures is formed on the first side of the substrate and a corresponding array of holes is formed in the second metallic layer.

Finally, the present invention also comprises a method for forming and using the device. The method for forming the device comprises a plurality of acts of forming and attaching the various parts as described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
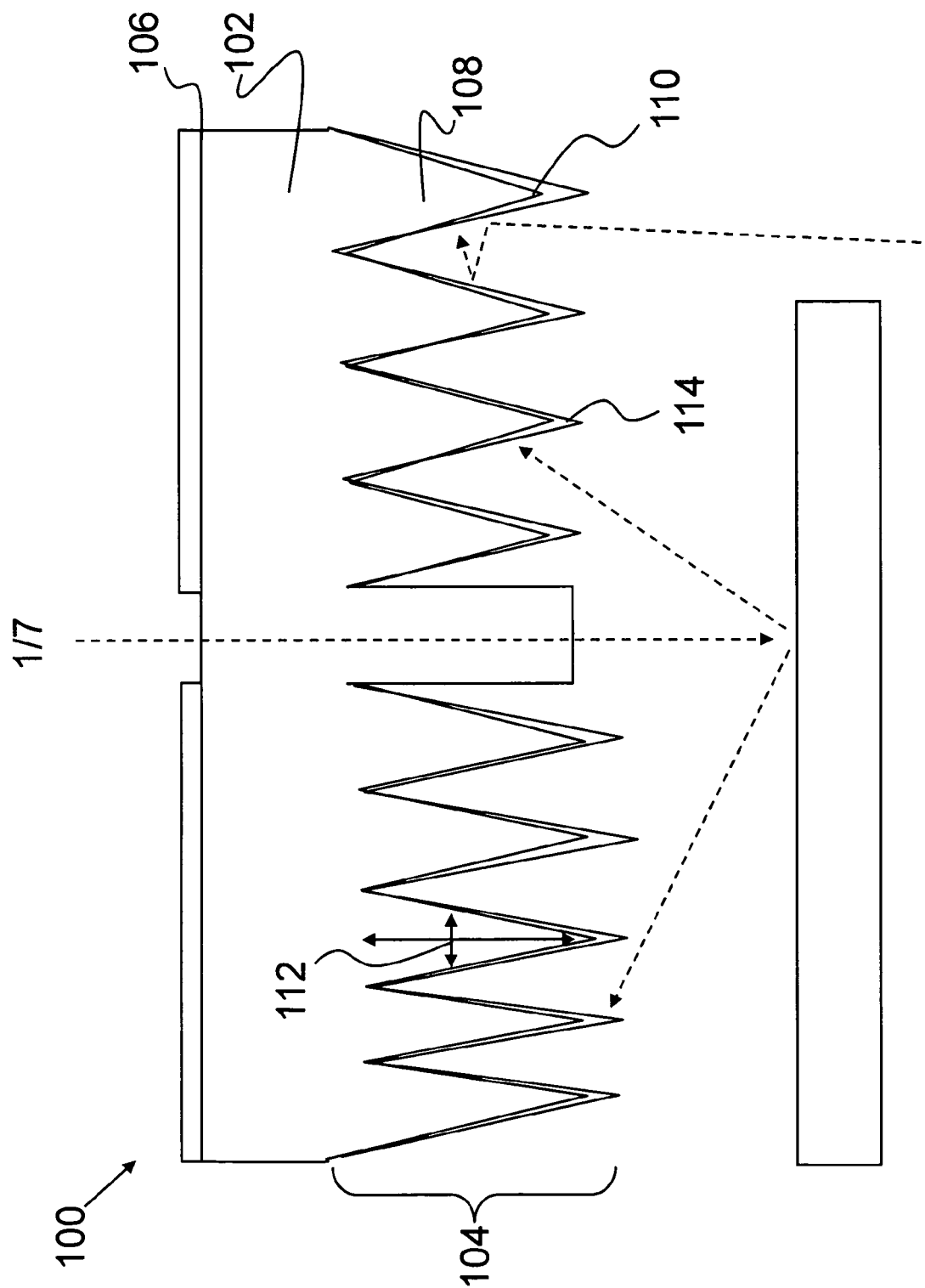
FIG. 1 is an illustration of a device having an anti-reflection surface according to the present invention.

The present invention relates to an anti-reflective surface and, more particularly, to a device having a plurality of nano-tips to form the anti-reflective surface. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Introduction

The present invention relates to a device having an anti-reflection surface. The prior art describes many ways to make anti-reflection surfaces. For example, surface texturing to generate a surface having a low-aspect ratio is one technique for reducing reflection. However, techniques of the prior art are often expensive and result in easily damaged surfaces. Additionally, a surface with a high-aspect ration would be more beneficial at reducing reflection than a surface with a low-aspect ratio. Manohara has reported a fabrication technique that uses a two-step dry etch process to produce high-aspect ratio silicon nano-tips. See, Manohara, H. *NASA Tech Briefs* 2004, 28 (11), 62.

The greatest advantage of the process described by Manohara is that it is inexpensive, simple, and that can be used on large area substrates. The process has the capability to be easily integrated with any monolithic silicon fabrication schemes. The present invention expands upon the work described by Manohara, adapting the technique of microfabricating high-aspect ratio nano-tips to create a highly efficient anti-reflection surface without using nanolithography. Described below are the anti-reflection surface fabrication technique and the optical characteristics of the nano-tips' surface.

(2) Specific Aspects (2.1) Basic Structure

As briefly described above, the present invention relates to a device having a high-aspect ratio, anti-reflection surface. As shown in FIG. 1, the device 100 comprises a silicon substrate 102 having a first side 104 and a second side 106. A plurality of silicon spikes 108 with nano-tips 110 are formed on the first side 104. The silicon spikes 108 are formed to have a high-aspect ratio 112 and thereby operate as an anti-reflection surface. Additionally, a first metallic layer 114 is formed on the silicon spikes 108. The first metallic layer 114 assists in absorbing light to further reduce reflection. The first metallic layer 114 is any suitable layer for blocking the transmission of light therethrough, a non-limiting example of which includes a Chromium/Gold layer. The Chromium is used as an adhesive to affix the Gold with the silicon.

(2.2) Nano-tip Formation

Figure 2:
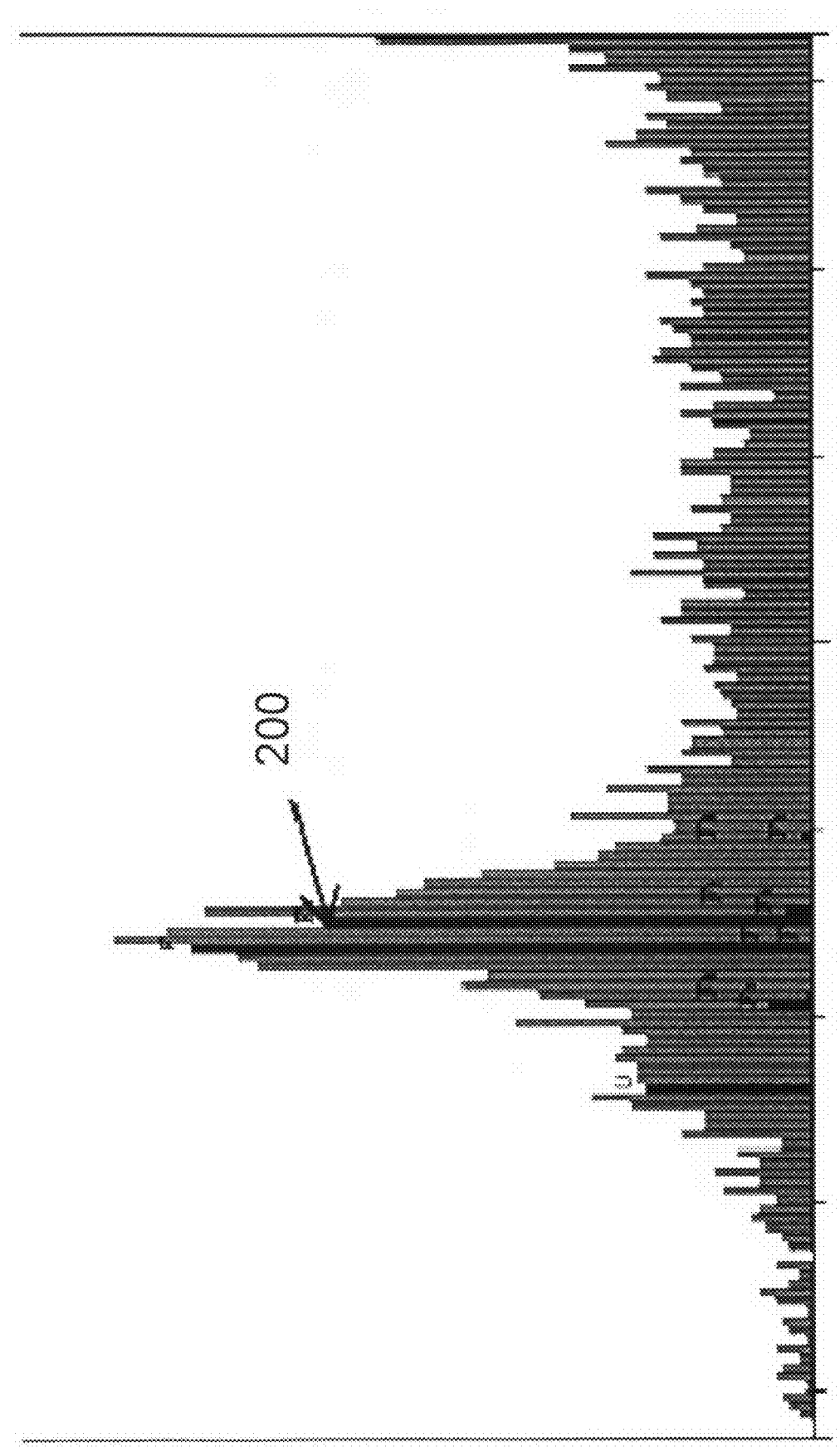
FIG. 2 is a graph illustrating results from an Energy-dispersive X-ray spectra, showing that micro-etch masks contain a high concentration of fluorine.

The basic principle of the fabrication technique is to grow micro-etch masks, which can then be etched away along with the substrate to make sharp nano-tips (for clarity, the first step will be referred to as the reactive ion etching (RIE) step and the second step will be referred to as the deep reactive ion etching (DRIE) step). In the RIE step, a cleaned silicon substrate, either with or without a pattern, is subjected to an REI process with a carbon tetrafluoride and oxygen mixture of 96% to 8%, respectively, at a radio-frequency (rf) power of 200 watts (W), for a predetermined amount of time. This process causes the growth of a micro-etch mask (e.g., certain fluorine-based compound) on the substrate in randomly distributed sites. These growths look like short, approximately quadrilateral, cross sectional stumps with a concave top. These are familiarly known as "polymer RIE grass," an unwanted byproduct of a dry-etching process. Depending on the process time, these growth sites may vary in their side dimension from 100 to 500 nanometers (nm) and grow as tall as a few hundred nanometers. The density of these sites decreases inversely with the process time. This is obvious as the neighboring sites merge due to growth as the process time is increased. To determine the compound creating the micro-etch, an Energy-dispersive X-ray spectra (EDX) is used. As shown in FIG. 2, the EDX revealed a fluorine peak 200 which indicates high concentration of fluorine in these growth sides. As shown, the relative intensities are high for fluorine, indicating a fluorine predominant compound.

Figure 3:
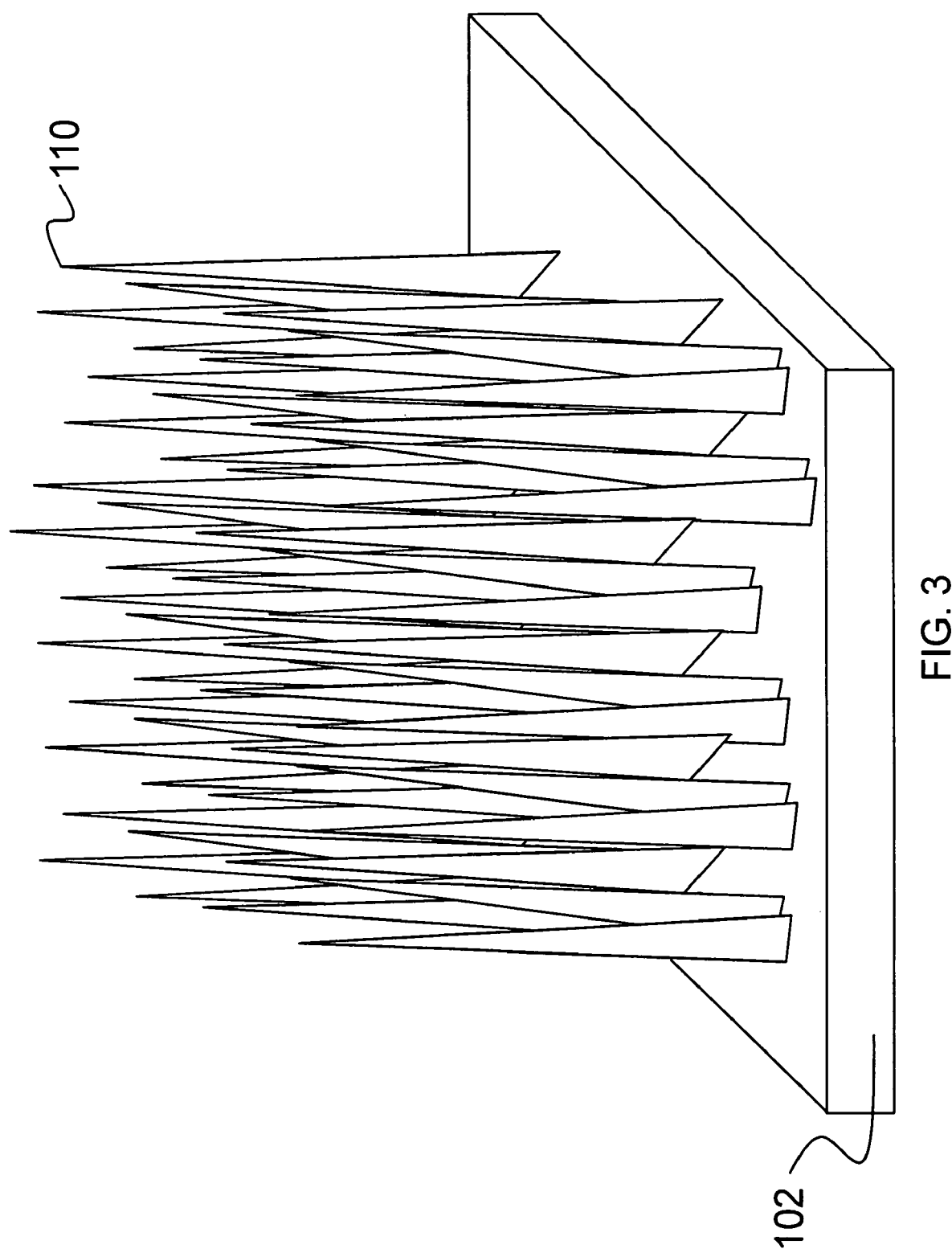
FIG. 3 is an enlarged-view illustration of exemplary high-density nano-tips.

In the next step, the substrate with the randomly distributed micro-etch masks is subjected to a process for forming high-aspect ratio silicon spikes with nano-tips. A non-limiting example of such a process is a deep reactive ion etching process (DRIE), which uses alternate cycles of etching and passivation. The etch gas is sulfur hexafluoride ($SF_6$), and the passivation gas is octafluorocyclobutane ($C_4F_8$). The gas flows of $SF_6$ and $C_4F_8$ are 130 and 85 standard cubic centimeters per minute (sccm), respectively. The coil power and platen power are 600 W and 140 W, respectively. The "polymer grass," grown in the RIE step described above, acts as an etch mask in this step, slowing down the etch rate directly underneath the mask. After eight minutes of process time, this causes dramatic-looking, tall silicon, spike-like structures, with sharp nano-tips of 15-20 nm diameter. Because of the DRIE process, these tips exhibit scalloping along their height, which gives them a corkscrew-like appearance. Depending on the thickness of the micro-etch masks, these tips can be fabricated to heights in excess of 20 micrometers (µm). It should be noted that the final nano-tip density varies inversely as the micro-etch mask density from the RIE step. This is because an optimum thickness of the mask is required to successfully achieve sharp tips in the DRIE process (because the etch mask itself gets etched during DRIE, but at a much slower rate). FIG. 3 illustrates an exemplary, enlarged-view of high-density nano-tips 110 formed on the silicon substrate 102.

(2.3) Sun Sensor Mask Fabrication

Figure 4A:
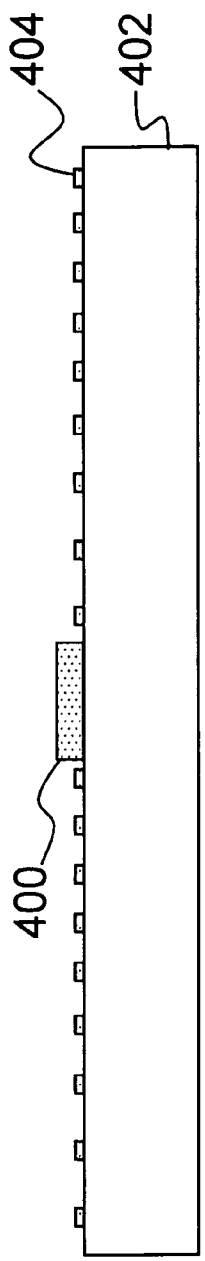
FIG. 4A is an illustration of a fabrication step of a device having an anti-reflection surface, showing the formation of a photoresist and microetch mask on a substrate.
Figure 4B:
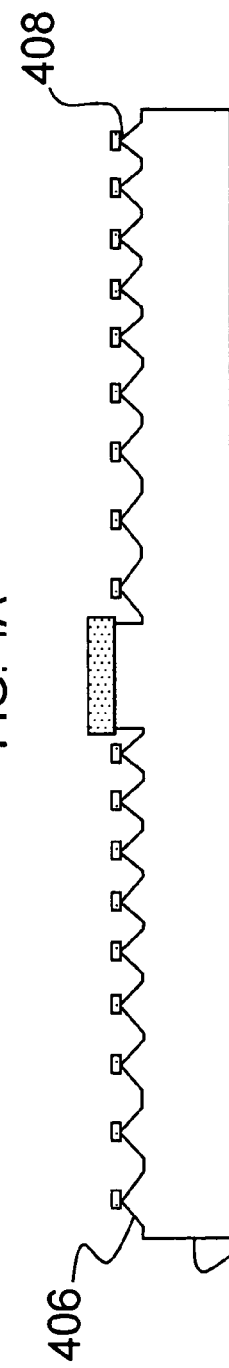
FIG. 4B is an illustration of a fabrication step of a device having an anti-reflection surface, showing the formation of silicon spikes and nano-tips.
Figure 4C:
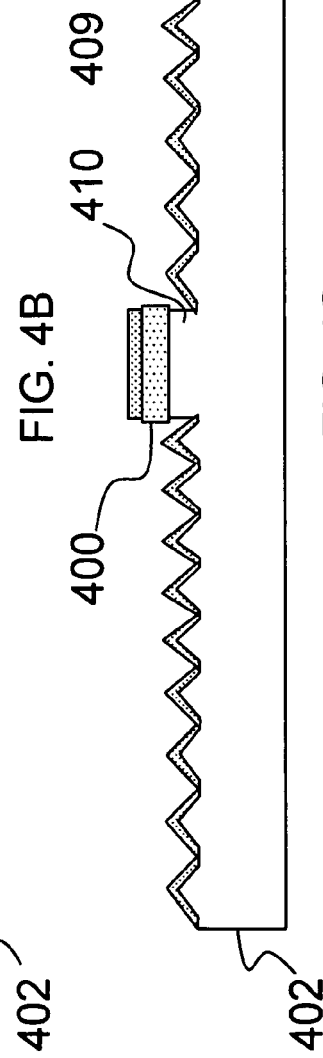
FIG. 4C is an illustration of a fabrication step of a device having an anti-reflection surface, showing a first metallic layer being formed on the nano-tips.

As can be appreciated by one skilled in the art, the anti-reflection surface described herein can be incorporated into a wide array of devices. As a non-limiting example, the anti-reflection surface can be incorporated into a Micro-sun sensor utilizing a sun sensor mask. FIG. 4 illustrates a procedure for fabricating a sun sensor mask. As shown in FIG. 4A, photo-lithography is performed on the silicon substrate 402 form a photoresist 400. The photoresist 400 defines an aperture array. Additionally, a micro-etch mask 404 (e.g., polymer "RIE grass") is grown on the silicon substrate 402. As shown in FIG. 4B, the substrate 402 with these randomly distributed features is subjected to a DRIE process to create high-aspect-ratio silicon spikes 406 with sharp nano-tips 408. Next, as shown in FIG. 4C, a first metallic layer 409 is evaporated on the nano-tip 408 surface to absorb the infrared light, except at the apertures 410. The first metallic layer is any suitable metal, a non-limiting example of which includes Chromium (Cr)/Gold (Au).

Figure 4D:
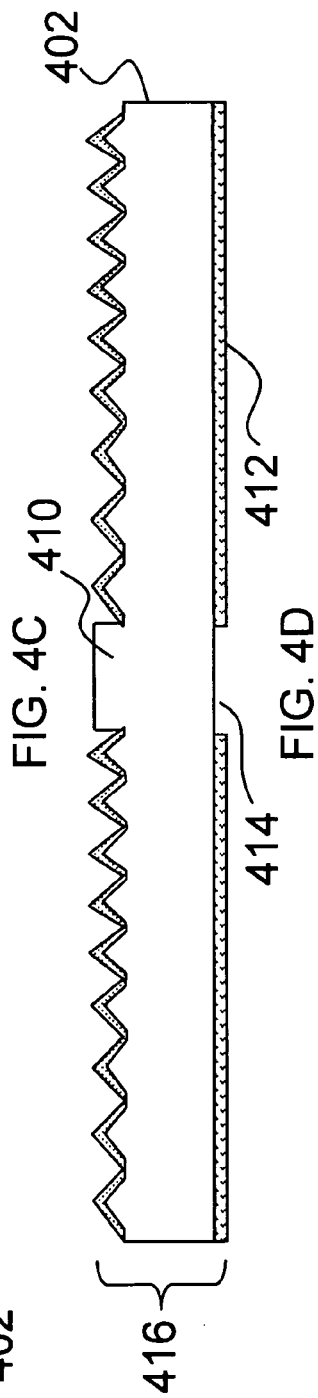
FIG. 4D is an illustration of a fabrication step of a device having an anti-reflection surface, showing a second metallic layer being formed on the substrate and the photoresist being removed.

As shown in FIGS. 4C and 4D, the photoresist 400 is removed to expose the aperture 410 below it. The photoresist 400 is removed through any suitable technique for removing a photoresist 400, a non-limiting example of which includes dipping the substrate 402 into acetone. Additionally, a second metallic layer 412 of a suitable material is evaporated on the backside of the substrate for the attenuation of sunlight. The second metallic layer 412 is any suitable metal for attenuating light, a non-limiting example of which includes Cr (e.g., 570 nanometer (nm) thick). Finally, a hole 414 is formed in the second metallic layer 412 such that the hole 414 is aligned with the aperture 410. The hole 414 allows light to pass through the substrate 402 and the aperture 410 toward a sensor apparatus, thereby operating as a sun sensor mask 416.

As can be appreciated by one skilled in the art, the hole 414 is formed in any suitable manner, non-limiting examples of which include being forming during deposition of the second metallic layer 412 or being formed after forming the second metallic layer 412.

It should be noted that the RIE grass growth tends to be less dense in the immediate vicinity of the patterned photoresist, within a margin of 1-2 μm around the pattern. This sometimes causes no nano-tip formation in that vicinity of the pattern. However, the lack of nano-tips in the vicinity of the pattern has been shown to not affect the anti-reflection performance of the coating on the sun sensor mask 416.

(2.4) Micro-Sun Sensor

Figure 5:
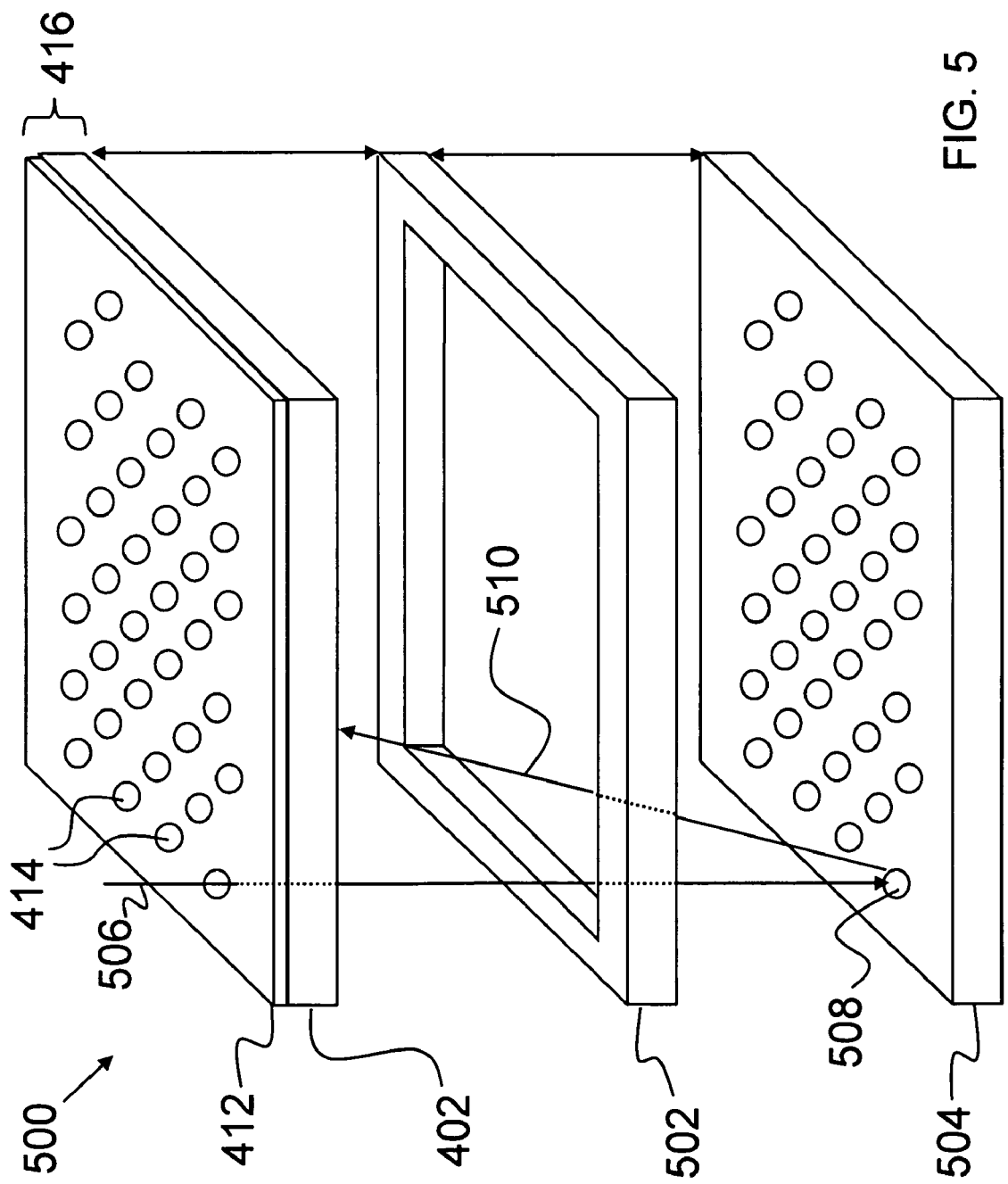
FIG. 5 is an exploded-view illustration of a device having an anti-reflection surface according to the present invention.

Using the sun sensor mask 416, a user can create a Micro-sun sensor. FIG. 5 illustrates an exploded view of a Micro-sun sensor 500. The Micro-sun sensor 500 comprises the sun sensor mask 416, a spacer 502 attached with the silicon substrate 402, and a sensor apparatus 504 attached with the spacer 502. The sensor apparatus 504 is attached with spacer 502 such that a gap exists between the sensor apparatus 504 and the silicon substrate 402. The sensor apparatus 504 is any suitable apparatus for sensing an element (e.g., light), a non-limiting example of which includes an Active Pixel Sensor (APS) chip.

As shown in FIG. 5, an array of holes 414 is formed in the second metallic layer 412. In this aspect, an array of corresponding apertures is also formed on the silicon substrate 402. The holes 414 allow light 506 to pass through the sun sensor mask 416 and form an image 508 on the sensor apparatus 504. Based on the location of the image, the sensor apparatus 504 can determine the direction of the sun. Additionally, reflected light 510 that is reflected towards the sun sensor mask 416 is absorbed by the silicon spikes (and corresponding metallic layer) and prevented from being re-reflected towards the sensor apparatus 504, thereby decreasing ghost images.

In other words, the light incident on the aperture will pass through the silicon and make an image on the APS chip. The light incident on the nano-tips from either side will be absorbed in the metals on the nano-tips. Thus, it can neither form an image on APS chip nor contribute to ghost images via reflection. The location on the APS of the resulting high contrast images of the aperture array is used to determine the sun angles.

(3) Exemplary Experimental Results

Figure 6A:
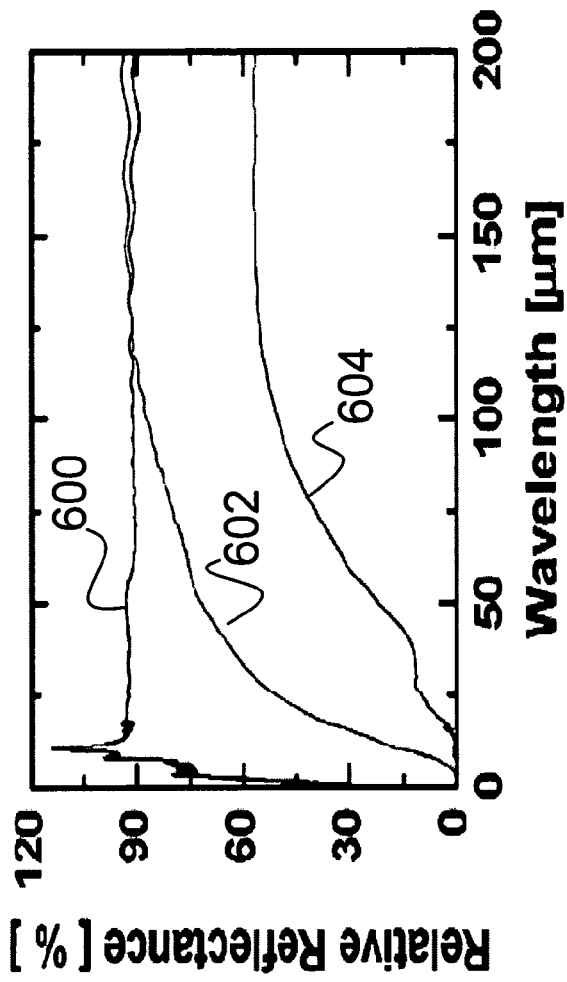
FIG. 6A is graph illustrating the specular reflectance of silicon nano-tips.
Figure 6B:
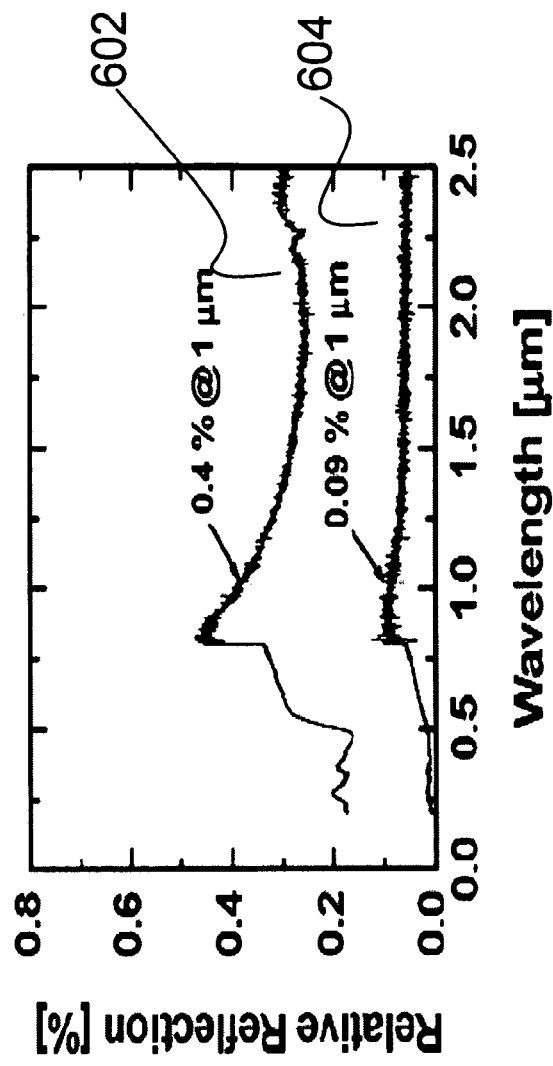
FIG. 6B is a graph illustrating a magnified section of the reflectance graph of FIG. 6A.

As can be appreciated by one skilled in the art, the following experimental results are for illustrative purposes only and are not intended to be limited thereto. FIGS. 6A and 6B are graphs illustrating the 30 degree specular reflectance measurement data of the nano-tips coated with Cr/Au. FIG. 6A is a reflectance graph, illustrating the relative reflectance of 5-minute REI samples 600, 10-minute REI samples 602, and 40-minute REI samples 604 from 0 to 200 μm wavelength range. FIG. 6B illustrates a magnified section of the reflectance graph of FIG. 6A, showing details of the relative reflectance in the short wavelength, 0 to 2.5 μm. At the 1 μm target wavelength, the reflectance of the 40-minute REI sample 604 surface is about 0.09%.

The purpose of the metal here is to improve absorption of the infrared (IR) light. It was measured on samples relative to an aluminum mirror, from 0.3 to 2.5 μm using a Cary 5000 UV-vis-NIR spectrometer. The samples were next measured using the same attachment relative to Au from 2.5 to 200 μm using a Bruker 66V FTIR with a beam splitter change for the far-IR region (16-200 μm), because Aluminum (Al) has more absorbance than gold in the far-IR region. The 30 degree specular reflectance of the 40 min RIE silicon nanotips with Cr/Au at the target wavelength of 1 μm is about 0.09%. The same value for bare silicon is almost 35% at the same wavelength, indicating a ~400-fold reduction in reflectance by the anti-reflection surface made of nano-tips coated with Cr/Au. In addition, as the RIE times increase, the specular reflectance decreases due to the higher density of the nano-tips. The reflectance of the substrate can be adjusted by changing the density of the nano-tips, which is determined by the "RIE-grass" growth process, as shown in FIG. 6A (the reflectance increases from a 40-min RIE surface 604 to a 5-min RIE surface 600 as 0.09% to 38.79%).

Figure 7:
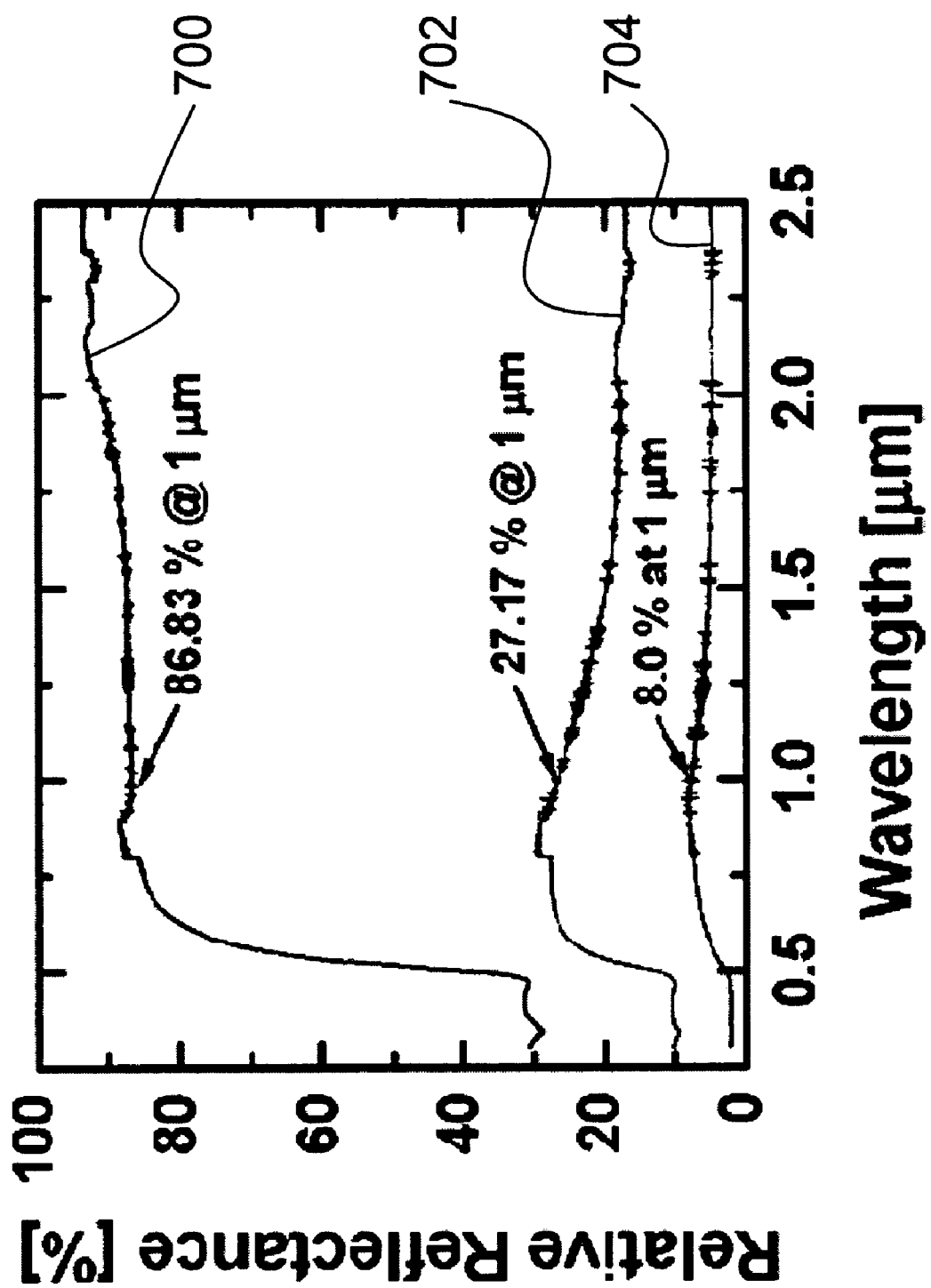
FIG. 7 is a graph illustrating hemispherical reflectance.

To assess the total reflectance from the nano-tip-covered surfaces, the hemispherical reflectance was measured from 0.3 to 2.5 μm wavelength range, which covers the wavelength of interest. FIG. 7 is a graph illustrating the total hemispherical reflectance of the samples with three different nano-tip densities that correspond to the RIE times illustrated in FIG. 6A (i.e., 5-minute REI samples 700, 10-minute REI samples 702, and 40-minute REI samples 704). These measurements were done using the Cary 5000 UV-vis-NIR spectrometer with a Cary integrating sphere attachment. The samples were measured relative to a Spectralon (Teflon) reflectance standard from 0.3 to 2.5 μm. Once again, it can be seen that the 40-minute RIE 704 surface has the lowest hemispherical reflectance among the three measured, with ~8% at 1 μm wavelength. The reflectances for 10-minute 702 and 5-minute 700 surfaces are 27.17% and 86.83%, respectively.

(4) Conclusion

The present invention is a device having an anti-reflection surface with an extremely low reflectance using randomly distributed silicon nano-tips. The fabrication process of these nano-tips uses standard silicon fabrication methods and is conducive for integration with batch-fabricated silicon devices. When the RIE process times are changed, the density and aspect ratios of nano-tips can be varied and hence the reflectance can be varied. Without using nanolithography, nano-tip radii has been achieved that spans from 20 to 100 nm with an aspect ratio of 200. The specular and the total hemispherical reflectances from a dense 40-minute RIE nano-tip surface were measured to be 0.09% (relative to an aluminum surface) and ~8% (relative to a standard Spectralon surface), respectively, at a target wavelength of 1 μm. This reflectance is nearly 3 orders of magnitude lower than that of plain silicon. This process can be used in the Micro-sun sensors to remove ghost images that, otherwise, drastically decrease the accuracy of these sensors. The process developed here is reproducible from the performance point of view. That is, the nano-tip formation itself is a random process and, as a result, it is impossible to produce nanotips in the same identical location from sample to sample. However, qualitatively, the surface density of these tips is reproducible from sample to sample, which has been evident from the reflectance data of multiple samples. For example, among three different 40-minute samples tested, the measured 30 degree specular reflectance is in the range of 0.05% to 0.09%. Thus, reproduction has been verified.

As can be appreciated by one skilled in the art, although the above description utilized many specific measurements and parameters, the invention is not limited thereto and is to be afforded the widest scope possible. Additionally, although the device is described as being incorporated into a Micro-sun sensor, it is not intended to be limited to such an aspect and can be incorporated into a wide array of devices for a large variety of uses.

What is claimed is:

1. An anti-reflective device, comprising:
   a silicon substrate having a first side and a second side, the first side having plurality of silicon spikes with nano-tips;
   a first metallic layer formed on the silicon spikes, thereby forming an anti-reflection surface;
   wherein the silicon spikes are formed to have a high-aspect ratio; and
   wherein the silicon spikes are formed on the first side such that an aperture exists on the first side, the aperture extending from the first side to the second side and being surrounded by silicon spikes on the first side.

2. An anti-reflective device as set forth in claim 1, wherein the first metallic layer comprises a layer of chromium and a layer of gold.

3. An anti-reflective device as set forth in claim 2, further comprising:
   a second metallic layer formed on the second side of the silicon substrate, the second metallic layer having a hole formed there through, where the hole is formed to be aligned with the aperture;
   a spacer attached with the first side of the silicon substrate; and
   a sensor apparatus attached with the spacer such that a gap exists between the sensor apparatus and the silicon substrate, thereby forming an anti-reflective device where light entering the hole passes through the aperture to be sensed by the sensor apparatus, and where light reflected by the sensor apparatus toward the first side of the silicon substrate is absorbed by the silicon spikes and is thereby prevented from being reflected toward the sensor apparatus.

4. An anti-reflective device, comprising:
   a silicon substrate having a first side and a second side, the first side having plurality of silicon spikes with nano-tips;
   a first metallic layer formed on the silicon spikes, thereby forming an anti-reflection surface;
   wherein the silicon spikes are formed on the first side such that an aperture exists on the first side, the aperture extending from the first side to the second side and being surrounded by silicon spikes on the first side.

5. An anti-reflective device as set forth in claim 4, further comprising:
   a second metallic layer formed on the second side of the silicon substrate, the second metallic layer having a hole formed there through, where the hole is formed to be aligned with the aperture;
   a spacer attached with the first side of the silicon substrate; and
   a sensor apparatus attached with the spacer such that a gap exists between the sensor apparatus and the silicon substrate, thereby forming an anti-reflective device where light entering the hole passes through the aperture to be sensed by the sensor apparatus, and where light reflected by the sensor apparatus toward the first side of the silicon substrate is absorbed by the silicon spikes and is thereby prevented from being reflected from the first side toward the sensor apparatus.

6. An anti-reflective device, comprising:
   a silicon substrate having a first side and a second side, the first side having plurality of silicon spikes with nano-tips, the plurality of silicon spikes being formed on the first side such that an aperture exists on the first side, the aperture extending from the first side to the second side and being surrounded by silicon spikes on the first side, and where the silicon spikes are formed to have a high-aspect ratio;
   a first metallic layer formed on the silicon spikes, thereby forming an anti-reflection surface;
   a second metallic layer formed on the second side of the silicon substrate, the second metallic layer having a hole formed there through, where the hole is formed to be aligned with the aperture;
   a spacer attached with the first side of the silicon substrate; and
   a sensor apparatus attached with the spacer such that a gap exists between the sensor apparatus and the silicon substrate, thereby forming an anti-reflective device where light entering the hole passes through the aperture to be sensed by the sensor apparatus, and where light reflected by the sensor apparatus toward the first side of the silicon substrate is absorbed by the silicon spikes and is thereby prevented from being reflected from the first side toward the sensor apparatus.

\* \* \* \* \*